United States Patent
Sloop

(10) Patent No.: US 9,825,341 B2
(45) Date of Patent: Nov. 21, 2017

(54) RECYCLING POSITIVE-ELECTRODE MATERIAL OF A LITHIUM-ION BATTERY

(71) Applicant: Steven E. Sloop, Bend, OR (US)

(72) Inventor: Steven E. Sloop, Bend, OR (US)

(73) Assignee: Steven E. Sloop, Bend, OR (US)

( * ) Notice: Subject to any disclaimer, the term of this patent is extended or adjusted under 35 U.S.C. 154(b) by 75 days.

(21) Appl. No.: 14/820,504

(22) Filed: Aug. 6, 2015

(65) Prior Publication Data

US 2016/0043450 A1 Feb. 11, 2016

Related U.S. Application Data

(60) Provisional application No. 62/034,105, filed on Aug. 6, 2014.

(51) Int. Cl.
*H01M 10/00* (2006.01)
*H01M 10/54* (2006.01)
*C01G 53/00* (2006.01)
*H01M 10/0525* (2010.01)

(52) U.S. Cl.
CPC ............ *H01M 10/54* (2013.01); *C01G 53/50* (2013.01); *H01M 10/0525* (2013.01); *Y02W 30/84* (2015.05)

(58) Field of Classification Search
CPC .... H01M 10/54; H01M 10/0525; H01M 6/52; C01G 53/06; C01D 15/00; C01D 15/02; C01D 15/08; Y02E 60/122
USPC ........................ 423/179.5; 429/49; 252/182.1
See application file for complete search history.

(56) References Cited

U.S. PATENT DOCUMENTS

| 5,882,811 | A * | 3/1999 | Kawakami ............... C22B 7/005 205/59 |
| 6,261,712 | B1 * | 7/2001 | Hayashi ................. H01M 10/54 423/179.5 |
| 6,844,103 | B2 * | 1/2005 | Lee ........................ C01G 51/42 422/225 |
| 8,882,007 | B1 | 11/2014 | Smith et al. |
| 2002/0124691 | A1 * | 9/2002 | Tateiwa ................... C22B 7/005 75/714 |
| 2009/0214933 | A1 * | 8/2009 | Sloop .................... H01M 10/052 429/49 |
| 2010/0203366 | A1 | 8/2010 | Sloop |

FOREIGN PATENT DOCUMENTS

| JP | 10-255862 | * | 9/1998 |
| JP | H10255862 A | | 9/1998 |
| JP | 11-054159 | * | 2/1999 |
| JP | H11054159 A | | 2/1999 |
| WO | 2015077080 A1 | | 5/2015 |

OTHER PUBLICATIONS

Ganter, M. et al., "Cathode Refunctionalization as a Lithium Ion Battery Recycling Alternative," Journal of Power Sources, vol. 256, Jun. 15, 2014, Published Online Jan. 24, 2014, 7 pages.

Gratz, E. et al., "A Closed Loop Process for Recycling Spent Lithium Ion Batteries," Journal of Power Sources, vol. 262, Sep. 15, 2014, Published Online Apr. 2, 2014, 8 pages.

ISA Korean Intellectual Property Office, International Search Report and Written Opinion Issued in Application No. PCT/US2015/044103, dated Sep. 30, 2015, WIPO, 13 pages.

Dokko, K. et al., "Identification of Surface Impurities on LiFePO4 Particles Prepared by a Hydrothermal Process," Journal of the Electrochemical Society, vol. 152, No. 11, Available Online Sep. 30, 2005, 4 pages.

European Patent Office, Supplementary European Search Report Issued in Application No. 15829934.7, dated May 29, 2017, Germany, 7 pages.

* cited by examiner

*Primary Examiner* — Steven Bos
(74) *Attorney, Agent, or Firm* — Alleman Hall Creasman & Tuttle LLP

(57) ABSTRACT

Examples are disclosed of methods to recycle positive-electrode material of a lithium-ion battery. In one example, the positive-electrode material is heated under pressure in a concentrated lithium hydroxide solution. After heating, the positive-electrode material is separated from the concentrated lithium hydroxide solution. After separating, the positive electrode material is rinsed in a basic liquid. After rinsing, the positive-electrode material is dried and sintered.

20 Claims, 1 Drawing Sheet

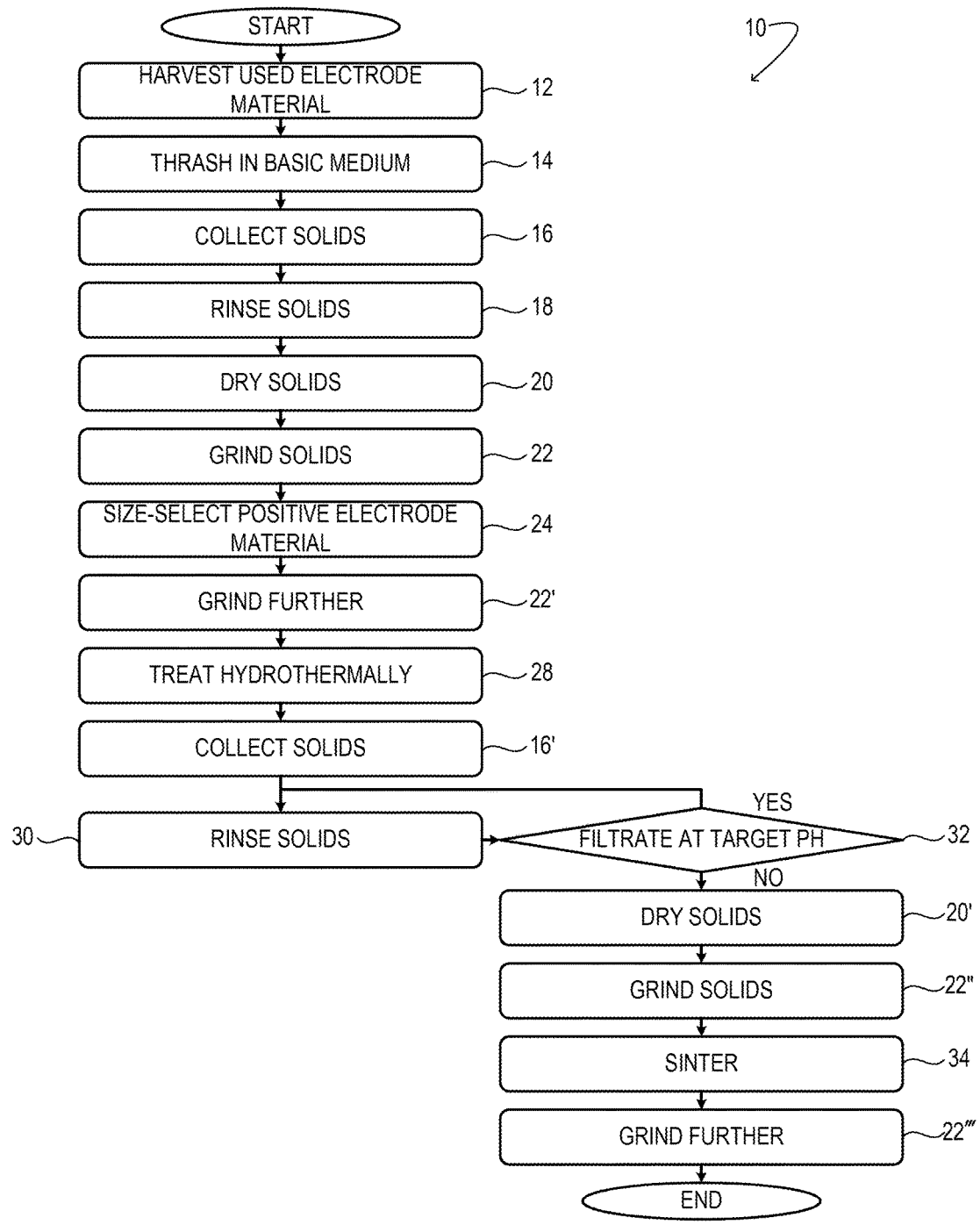

RECYCLING POSITIVE-ELECTRODE MATERIAL OF A LITHIUM-ION BATTERY

CROSS REFERENCE TO RELATED APPLICATION

The present application claims priority to U.S. provisional application Ser. No. 62/034,105 entitled RECYCLING POSITIVE-ELECTRODE MATERIAL OF A LITHIUM-ION BATTERY filed Aug. 6, 2014, the entire contents of which are hereby incorporated by reference in its entirety for all purposes.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of innovation research award DE SC-0006336 awarded by the Department of Energy.

TECHNICAL FIELD

The present application relates to the field of lithium-ion batteries, and more particularly, to recycling the positive-electrode material of a lithium-ion battery.

BACKGROUND

Lithium-ion batteries provide power to products ranging from automobiles to smart phones. These batteries are rechargeable over many cycles, tolerant to various environmental factors, and have a relatively long useful lifetime. Nevertheless, they eventually fail or are discarded prior to failure, and therefore contribute to a significant and growing waste stream. In view of this situation, environmental regulations, industry standards, and collection services have arisen to promote the recycling of lithium-ion batteries.

SUMMARY

Examples are disclosed of methods to recycle positive-electrode material of a lithium-ion battery. In one example, the positive-electrode material is heated under pressure in a concentrated lithium hydroxide solution. After heating, the positive-electrode material is separated from the concentrated lithium hydroxide solution. After separating, the positive electrode material is rinsed in a basic liquid of. After rinsing, the positive-electrode material is dried and sintered.

BRIEF DESCRIPTION OF THE DRAWING

FIG. 1 illustrates an example method to recycle a lithium-ion battery in accordance with an embodiment of this disclosure.

DETAILED DESCRIPTION

FIG. 1 illustrates aspects of an example method 10 to recycle previously used positive-electrode material of a lithium-ion battery. The illustrated example is somewhat optimized to positive-electrode materials based on nickel-manganese-cobalt (NMC) chemistry, where the positive electrode material includes lithium nickel manganese cobalt oxide (NMC: Li[Ni(1/3)Co(1/3)Mn(1/3)]O2 has Ni:Co:Mn ratio of 1:1:1, and many varieties exist with different metal ratios, for example 6:2:2, 5:2:3, 4:2:2 and others) as the electroactive material. Nevertheless, all aspects of the illustrated method are applicable to other positive-electrode chemistries as well. Examples of other positive-electrode materials include, but are not limited to, other materials in which nickel is in a +3 oxidation state.

At 12 of method 10, a quantity of previously used positive-electrode material is harvested. The positive-electrode material may be harvested from any suitable source, such as a lithium-ion battery waste or recycling stream. In other embodiments, the positive-electrode material may be harvested from a generic waste or recycling stream. In some scenarios, the positive-electrode material may be harvested from batteries that have exceeded a recommended shelf life or recommended maximum number of recharge cycles.

The harvesting enacted at 12 may include disassembly of one or more lithium-ion batteries and removal of the positive-electrode material therein. Typically, a lithium-ion battery includes a housing that supports positive and negative exterior terminals and encloses the positive and negative electrodes and non-aqueous electrolyte solution. The positive exterior terminal may be connected via the housing to the positive electrode, while the negative exterior terminal may be connected through the housing to the negative electrode. Depending on the battery configuration, the housing may be breeched by cutting, drilling, and/or prying, to expose the positive- and negative-electrode materials and the electrolyte. In some embodiments, the housing may be breeched under an atmosphere of reduced oxygen and/or humidity. For example, the housing may be breeched under a blanket of nitrogen, argon, or carbon dioxide. Such measures may help to prevent the negative electrode material (which may include metallic lithium or lithium-intercalated carbon) from igniting or releasing an undesirable amount of heat.

Typically, the harvesting enacted at 12 will include removal of the housing and exterior terminals, the non-aqueous electrolyte, and the negative electrode. These components may be recycled separately, if desired. Removal of the housing, exterior terminals, non-aqueous electrolyte, and negative electrode leaves behind the positive electrode, which may include a positive-electrode material be supported on an aluminum or other metallic/conductive foil substrate. The positive-electrode material may also include a significant amount a polymeric binder (e.g., a fluoropolymer or styrene polybutadiene).

In one embodiment, the positive-electrode material may include NMC (LiNi$_x$Mn$_y$Co$_z$O$_2$ with various ratios of Ni:Mn:Co, for example, 1:1:1; 5:3:2; 4:4:2; 6:2:2; 2:6:2). In another embodiment, the positive-electrode material may include lithium cobalt oxide (LiCoO$_2$, LCO), lithium manganese oxide (LiMn$_2$O$_4$, LMO), lithium nickel cobalt aluminum oxide (Li Ni$_x$ Co$_y$ Al$_z$ O$_2$, NCA), lithium iron phosphate (LiFePO$_4$, LFP) or lithium titanate (Li$_4$Ti$_5$O$_{12}$). In the forms typically recovered from waste or recycling streams, these compounds may be lithium-deficient. In other words, they may contain less than the stoichiometric number of lithium ions (Li$^+$) compared with the originally manufactured lithium metal oxide material. Accordingly, the recycling method described herein provides an additional benefit of replenishing the lithium content of the recycled positive-electrode materials.

Continuing in FIG. 1, at 14 the supported positive-electrode material is mechanically thrashed in basic medium. This action mechanically separates (i.e., delaminates) the positive-electrode material from the support, partially separates the positive-electrode material and from the binder, and breaks each of these components down to a manageable particle size to facilitate subsequent mechanical and chemical processing (vide infra). Thrashing in a basic medium—as opposed to an acidic or neutral media—has been found to lessen the rate of decomposition of the positive-electrode material during the thrashing process. In some embodiments, the basic medium may be a liquid medium in which the positive-electrode material is suspended—e.g., an aqueous or non-aqueous solution. In one embodiment, the positive-electrode material is suspended in ambient-temperature water basified with lithium hydroxide (LiOH) to a pH in the range of 11.0 to 11.5. This pH range is basic enough to retard acid hydrolysis of NMC as the positive-electrode material, but not so basic as to promote rapid oxidation of the aluminum foil support of the positive-electrode material, which could proliferate aluminum ions through the system. In other embodiments, different bases, solvents, and pH ranges may be used. In particular, the pH range may be adjusted based on the chemical identity of the positive-electrode material—e.g., a more basic pH range for more basic materials, and a less basic range for less basic materials. In one particular embodiment, the desirable pH for rinsing is the same as the pH that the suspended positive-electrode material imparts to deionized water.

Continuing in FIG. 1, as one non-limiting example, the thrashing of the suspended positive-electrode material may be conducted in a rotating-blade thrashing vessel, which loosely resembles a household blender, but may accommodate samples of one to ten liters. In a typical run, 0.5 to 2 kilograms of supported positive-electrode material are thrashed in one liter of basified water for 5 minutes. Naturally, other sample sizes and thrashing times are contemplated as well.

At 16 the various solids deriving from the supported positive-electrode material are collected from the thrashed slurry. The solids may be collected by gravity filtration, pressure filtration, vacuum filtration, and/or centrifugation, for example.

At 18 the collected solids are rinsed with a liquid to remove the basic medium used in the thrashing, and to remove any electrolyte (salts and non-aqueous solvent) retained on the supported positive-electrode material prior to thrashing. The rinsing may be done in the filtration or centrifugation apparatus used for solids collection. In some embodiments, an organic solvent may be used for the rinsing. It is desirable that the chosen solvent be partially or fully miscible with water, so that the rinsing process also removes entrained water (from the basic thrashing medium) from the collected solids. It is also desirable that the solvent be recoverable from the rinsings, innocuous to workers and to the environment, and/or suitable for inexpensive disposal compliant with applicable laws. Acetone, ethanol, and some other alcohols are good candidates for the rinsing solvent due to their miscibility with water, relatively low toxicity, and ability to dissolve the solvents and salts of the non-aqueous electrolyte (e.g., lithium hexafluophosphate and its decomposition products such as LiF and various phosphates, lithium triflate, ethylene carbonate, diethyl carbonate, etc.). Acetone and ethanol are also potentially recoverable from the rinsings by distillation at reduced pressure.

Acetone has additional attractive properties as a rinse solvent because it is a good solvent for organics and a relatively poor solvent for LiOH. More specifically, various organic compounds—e.g., low molecular-weight polymers and fluoropolymers, plasticizers, etc.—may be present in the binder, which is used to adhere the positive-electrode material to the substrate. Washing with acetone dissolves or solublizes at least some of these components, allowing them to be rinsed away and excluded from subsequent processing. This increases the purity of the recycled positive-electrode material. In addition, the low solubility of LiOH in acetone is a benefit in embodiments where the thrashing is done in water basified with lithium hydroxide (LiOH). Here, a small amount of LiOH remains on the rinsed solids, which may act to suppress acid hydrolysis of the positive-electrode material during the recycling procedure.

In other embodiments, the collected solids may be rinsed in a different organic solvent, in an aqueous solution of having a suitable pH (e.g. an aqueous LiOH solution having a pH of 11.0-11.5). Supercritical carbon dioxide may also be used. Despite the advantages of the rinsing enacted at 18, this step is by no means essential, and may be omitted in some embodiments.

At 20 the rinsed solids are dried to remove sorbed water and residual rinse solvent. In the various embodiments here contemplated, the drying may be done in vacuuo, or under a stream of dehumidified (e.g., heated) air or other dry gas, such as nitrogen, argon, or carbon dioxide. In one embodiment, the rinsed solids are dried in a vacuum oven at 140° C.

At 22 the dried solids are mechanically ground. The purpose of this grinding step is to reduce the particle size of the positive-electrode material, in particular, to improve yield in subsequent sieving. In one non-limiting example, a ball mill may be used for the grinding. In a typical run, a 400-milliliter capacity ball mill is charged with 60 grams of dried solid and 30# agate spheres of 0.5 to 1 centimeter mixed diameter. The mill may be run for 3 to 5 minutes at 50 Hz, for example. It will be noted that the grinding enacted at 22 may undesirably reduce some of the aluminum substrate to a particle size comparable to that of the positive-electrode material, which may reduce the effectiveness of subsequent purification by size selection. Omitting or shortening the grinding step or modifying the ball-mill frequency may increase product purity, at the expense of yield.

At 24 the ground solids are subject to size selection using one or more fine sieves, in order to isolate the positive electrode material from pieces of substrate, binder, and steel filings that may be created by cutting the batteries apart during the harvesting step. In one embodiment, the positive-electrode material selected for further processing is the portion that passes through a 38 to 45 micron sieve, preferably a 38 micron sieve. This fraction, at 22', is subjected to a second grinding step to further reduce its particle size. Without wishing to be bound by theory, the second grinding step is believed to increase the efficiency of subsequent hydrothermal treatment, to restore the stoichiometric lithium content of the recycled positive-electrode material. Naturally, other sequences of grinding and size exclusion are contemplated as well. In some embodiments, a fine filtration step conducted in basified liquid medium may be used in lieu of sieving.

At 28, the twice ground solids are introduced into an autoclave together with concentrated aqueous LiOH. The hydrothermal treatment may help to restore the stoichiometric lithium content of the positive electrode material, for example, by displacing any foreign cations (i.e. impurities) or misplaced cations (i.e. nickel ions that may migrate to lithium sites in a lattice) that may be present. In one embodiment, one liter of 24% LiOH may be used for each kilogram of positive-electrode material. It will be noted that this concentration of LiOH exceeds saturation at typical ambient temperatures. The contents of the autoclave may be ramped from ambient temperature of 250 to 275° C. at a rate of 5° C. per minute, and maintained at that temperature for 12 to 14 hours. Higher temperatures are found to reduce yield, potentially by promoting undesirable side reactions involving the residual binder. In other examples, any other suitable solution of lithium ions than a lithium hydroxide solution may be used in the hydrothermal treatment.

At 16' the cooled, hydrothermally treated solids are collected, and at 30 the solids are rinsed to remove excess LiOH. Experiments have revealed that the performance of the recycled positive-electrode materials is sensitive to the manner of rinsing at this stage of the process. In particular, it appears that neutral-to-acidic conditions should be avoided in order to optimize the desirable properties electrochemical of the positive-electrode material (e.g., capacity and current capability). Without wishing to be bound by theory, sensitivity to acid hydrolysis may be especially great at this stage because the binder has been mostly eliminated. Accordingly, the collected solids may be rinsed with water basified by LiOH to a pH in the same range as used in rinsing step 18—e.g., pH 11.0 to 11.5 for NMC. Alternatively, the collected solids may be rinsed with less basic or even deionized water, while, at 32, the pH of the filtrate is continuously monitored. Other suitable solvents for rinsing may include, but are not limited to, nonaqueous solvents such as liquid carbon dioxide, supercritical carbon dioxide, methanol, ethanol, isopropol alcohol, t-butanol, n-butanol, glycol, polyethelene glycol, and/or solutions thereof. Rinsing is ended when the pH of the filtrate falls within the desired range. For a typical 500-gram batch of positive-electrode material, a total of 4 liters of wash water may be used, prior to the pH dropping into the target range. In another embodiment, 4 liters of aqueous LiOH within a desired pH range may be used.

At 20' the rinsed, hydrothermally treated solids are dried in vacuuo at 150 to 160° C., and at 22', the solids are ground for a third time to a desirable particle size. Without wishing to be bound by theory, grinding at this stage is believed to increase the efficiency of subsequent sintering. At 36, the thrice-ground solids are sintered under a flow of air or oxygen. In one embodiment, a tube furnace may be used for the sintering. The temperature of the specimen in the furnace may be ramped, as one non-limiting example, from ambient temperature to 900° C. at a rate of 2 to 3° C. per minute, and maintained at that temperature for 8 hours. Sintering may help to enlarge the crystallites of the positive-electrode material and convert them to an allotropic form that is more stable at higher temperatures. Experiments have revealed that the high-temperature allotrope of NMC provides better performance in lithium-ion batteries. The final stage of the sintering involves rapid cooling of the specimen. In one embodiment, the specimen may be reduced from 900° C. to ambient temperature at a rate of about 50° C. per minute, as one non-limiting example. Such a cooling rate may help to 'lock' the crystallites of positive-electrode material in an allotropic form that is most stable at elevated temperatures, and prevent back-conversion to forms that may be more stable at lower temperatures. Use of oxygen in the sintering process may assist in oxidizing nickel ions in formulations of NMC.

In one embodiment, the rapid cooling of the sintered specimen may be conducted under a flow of carbon dioxide, which is admitted to the furnace. The carbon dioxide converts the lithium oxide (derived from excess LiOH) into lithium carbonate ($Li_2CO_3$). Preliminary evidence suggests that small amounts of $Li_2CO_3$ introduced with the positive-electrode material may improve the performance of a lithium ion battery. For example, conversion of the excess LiOH to the less hygroscopic $Li_2CO_3$ may help to keep the positive-electrode material drier during storage and transport. At 22''' the sintered positive-electrode material is ground once again to provide a particle size that is particularly suitable for application on a new positive electrode support.

Some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used. It will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A method to recycle a positive-electrode material of a lithium-ion battery, the method comprising:
heating the positive-electrode material under pressure in a solution comprising lithium ions;
after heating, separating the positive-electrode material from the solution comprising lithium ions;
after separating, rinsing the positive electrode material in a basic liquid; and
after rinsing, drying and sintering the positive electrode material.

2. The method of claim 1, wherein rinsing the positive electrode material includes rinsing with a solution or buffer of basic pH.

3. The method of claim 1, wherein rinsing the positive electrode material comprises rinsing with a solution of water and lithium hydroxide.

4. The method of claim 1, wherein rinsing the positive electrode material includes rinsing with a nonaqueous solvent comprising one or more of methanol, ethanol, isopropol alcohol, t-butanol, n-butanol, glycol, polyethelene glycol and solutions thereof.

5. The method of claim 1, further comprising passing the positive-electrode material through a sieve prior to heating, to separate the positive-electrode material from other solids.

6. The method of claim 5, further comprising thrashing the positive-electrode material in one or more of a basic medium, a nonaqueous solvent comprising one or more of methanol, ethanol, isopropol alcohol, t-butanol, n-butanol, glycol, polyethelene glycol, liquid, supercritical carbon dioxide, and solutions thereof prior to passing the positive-electrode material through the sieve.

7. The method of claim 6, wherein thrashing the positive-electrode material comprises thrashing in a lithium hydroxide solution.

8. The method of claim 1, further comprising cooling the positive-electrode material in an inert atmosphere after sintering, to convert residual lithium oxide in the positive-electrode material to lithium carbonate.

9. The method of claim 1, further comprising grinding the positive-electrode material after drying to reduce a particle size of the positive-electrode material.

10. The method of claim 1, wherein the solution comprising lithium ions comprises a concentrated lithium hydroxide solution.

11. A method to recycle a positive-electrode material of a lithium-ion battery, the method comprising:
   heating the positive-electrode material under pressure in a concentrated lithium hydroxide solution;
   after heating, separating the positive-electrode material from the concentrated lithium hydroxide solution;
   after separating, rinsing the positive electrode material in a basic liquid; and
   after rinsing, drying and sintering the positive-electrode material.

12. The method of claim 11, wherein rinsing the positive electrode material comprises rinsing with a solution of water and lithium hydroxide.

13. The method of claim 11, wherein rinsing the positive electrode material includes rinsing with a nonaqueous solvent comprising one or more of methanol, ethanol, isopropol alcohol, t-butanol, n-butanol, glycol, polyethelene glycol, liquid or supercritical carbon dioxide and solutions thereof.

14. The method of claim 11, further comprising passing the positive-electrode material through a sieve prior to heating, to separate the positive-electrode material from other solids.

15. The method of claim 14, further comprising thrashing the positive-electrode material in a basic medium prior to passing the positive-electrode material through the sieve.

16. The method of claim 15, wherein thrashing the positive-electrode material comprises thrashing in a lithium hydroxide solution.

17. The method of claim 11, further comprising cooling the positive-electrode material in an inert atmosphere after sintering, to convert residual lithium oxide in the positive-electrode material to lithium carbonate.

18. The method of claim 11, further comprising grinding the positive-electrode material after drying to reduce a particle size of the positive-electrode material.

19. A method to recycle a positive-electrode material of a lithium-ion battery, the method comprising:
   thrashing the positive-electrode material in a basic medium;
   collecting the positive-electrode material via filtration;
   heating the positive-electrode material under pressure in a concentrated lithium hydroxide solution;
   after heating, separating the positive-electrode material from the concentrated lithium hydroxide solution;
   after separating, rinsing the positive-electrode material in a basic liquid; and
   after rinsing, drying and sintering the positive-electrode material.

20. The method of claim 19, further comprising cooling the positive-electrode material in an inert atmosphere after sintering, to convert residual lithium oxide in the positive-electrode material to lithium carbonate.

* * * * *